US010837359B2

(12) United States Patent
Suciu et al.

(10) Patent No.: US 10,837,359 B2
(45) Date of Patent: *Nov. 17, 2020

(54) GAS TURBINE ENGINE WITH DISTRIBUTED FANS

(71) Applicant: Raytheon Technologies Corporation, Hartford, CT (US)

(72) Inventors: Gabriel L. Suciu, Glastonbury, CT (US); Michael E. McCune, Colchester, CT (US); Jesse M. Chandler, South Windsor, CT (US); Alan H. Epstein, Lexington, MA (US); Steven M. O'Flarity, Glastonbury, CT (US); Christopher J. Hanlon, Sturbridge, MA (US); William F. Schneider, Cromwell, CT (US); Joseph B. Staubach, Colchester, CT (US); James A. Kenyon, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 677 days.

This patent is subject to a terminal disclaimer.

(21) Appl. No.: 15/443,113

(22) Filed: Feb. 27, 2017

(65) Prior Publication Data

US 2017/0306842 A1 Oct. 26, 2017

Related U.S. Application Data

(63) Continuation of application No. 14/597,510, filed on Jan. 15, 2015, now Pat. No. 9,650,954.

(Continued)

(51) Int. Cl.
*F02C 3/107* (2006.01)
*B64D 35/04* (2006.01)
(Continued)

(52) U.S. Cl.
CPC .............. *F02C 3/107* (2013.01); *B64D 27/18* (2013.01); *B64D 35/04* (2013.01); *F01D 13/003* (2013.01);
(Continued)

(58) Field of Classification Search
CPC .. F02C 3/10; F02C 3/067; F02C 3/107; F02C 7/36; F02K 3/02; F02K 3/077; F01D 13/003
See application file for complete search history.

(56) References Cited

U.S. PATENT DOCUMENTS 3,054,577 A 9/1962 Wolf et al.
3,312,426 A * 4/1967 Fowler .................. B64C 23/005
244/12.5

(Continued)

FOREIGN PATENT DOCUMENTS

EP 1916406 A2 4/2008
GB 2400411 A 10/2004

OTHER PUBLICATIONS

European Search Report for European Patent Application No. 15153711.5 dated Aug. 3, 2015.

*Primary Examiner* — Arun Goyal
(74) *Attorney, Agent, or Firm* — Carlson, Gaskey & Olds, P.C.

(57) ABSTRACT

A gas generator has at least one compressor rotor, at least one gas generator turbine rotor and a combustion section. A fan drive turbine is positioned downstream of a path of the products of combustion having passed over the at least one gas generator turbine rotor. The fan drive turbine drives a shaft and the shaft engages gears to drive at least three fan rotors.

20 Claims, 7 Drawing Sheets

Related U.S. Application Data

(60) Provisional application No. 61/989,675, filed on May 7, 2014, provisional application No. 61/938,907, filed on Feb. 12, 2014, provisional application No. 61/937,153, filed on Feb. 7, 2014.

(51) Int. Cl.
  F01D 13/00 (2006.01)
  F02K 3/077 (2006.01)
  F02C 7/36 (2006.01)
  B64D 27/18 (2006.01)
  F02C 3/06 (2006.01)
  F02C 3/067 (2006.01)
  F02C 9/18 (2006.01)

(52) U.S. Cl.
  CPC ............... F02C 3/06 (2013.01); F02C 3/067 (2013.01); F02C 7/36 (2013.01); F02C 9/18 (2013.01); F02K 3/077 (2013.01); F05D 2220/323 (2013.01); F05D 2220/36 (2013.01); F05D 2240/40 (2013.01); F05D 2250/312 (2013.01)

(56) References Cited

U.S. PATENT DOCUMENTS

| | | | |
|---|---|---|---|
| 5,015,796 A | 5/1991 | Slaugh et al. | |
| 5,103,631 A * | 4/1992 | Edwards | F02C 3/107 60/39.163 |
| 5,161,369 A | 11/1992 | Williams | |
| 5,792,745 A | 8/1998 | Cheng et al. | |
| 7,752,834 B2 | 7/2010 | Addis | |
| 7,921,634 B2 * | 4/2011 | Orlando | F01D 1/24 60/204 |
| 8,307,626 B2 * | 11/2012 | Sheridan | F01D 25/20 184/26 |
| 8,915,700 B2 * | 12/2014 | Kupratis | F02C 7/36 415/122.1 |
| 9,140,188 B2 * | 9/2015 | Kupratis | F02C 7/143 |
| 9,297,270 B2 * | 3/2016 | Suciu | F01D 15/12 |
| 2004/0025493 A1 | 2/2004 | Wojciechowski | |
| 2008/0098719 A1 | 5/2008 | Addis | |
| 2009/0229243 A1 | 9/2009 | Guemmer | |
| 2013/0104522 A1 * | 5/2013 | Kupratis | F02K 3/077 60/204 |
| 2013/0223991 A1 | 8/2013 | Suciu et al. | |

\* cited by examiner

GAS TURBINE ENGINE WITH DISTRIBUTED FANS

CROSS-REFERENCE TO RELATED APPLICATION

This application is a continuation of U.S. patent application Ser. No. 14/597,510, filed Jan. 15, 2015, which claims priority to U.S. Provisional Patent Application Nos. 61/989,675, filed May 7, 2014; 61/938,907, filed Feb. 12, 2014; and 61/937,153, filed Feb. 7, 2014.

BACKGROUND OF THE INVENTION

Gas turbine engines are known and typically include a fan delivering air as bypass air into a bypass housing and further delivering air into a core engine. Air in the core engine is directed into a compressor where it is compressed. The compressed air is then delivered into a combustion section where it is mixed with fuel and ignited. Products of this combustion pass downstream over turbine rotors, driving them to rotate.

Recently, it has been proposed to increase the diameter of the fan to, in turn, increase bypass ratios, or the volume of air delivered as bypass or propulsion air compared to the volume of air delivered into the core engine. However, the ability to make this increase is somewhat limited by the packaging envelope available on an aircraft.

It has been proposed to replace a single large diameter with a plurality of fan rotors. However, the proposals for driving the plurality of fan rotors have deficiencies in general.

SUMMARY OF THE INVENTION

In a featured embodiment, a gas turbine engine comprises a gas generator with at least one compressor rotor, at least one gas generator turbine rotor and a combustion section. A fan drive turbine is positioned downstream of a path of the products of combustion having passed over the at least one gas generator turbine rotor. The fan drive turbine drives a shaft and the shaft engages gears to drive at least three fan rotors.

In another embodiment according to the previous embodiment, the gas generator includes at least two compressor rotors and at least two gas generator turbine rotors. The fan drive turbine is positioned to be downstream of a path of the products of combustion having passed over each of the at least two gas generator turbine rotors.

In another embodiment according to any of the previous embodiments, an axis of rotation of the gas generator is generally perpendicular to an axis of rotation of the shaft.

In another embodiment according to any of the previous embodiments, an axis of rotation of the gas generator is generally coaxial with an axis of rotation of the shaft.

In another embodiment according to any of the previous embodiments, the shaft is generally hollow.

In another embodiment according to any of the previous embodiments, the shaft includes at least one flex coupling associated with a gear for driving one of the fan rotors.

In another embodiment according to any of the previous embodiments, each fan rotor is provided with a separately driven oil pump, oil supply and oil scavenge line.

In another embodiment according to any of the previous embodiments, the at least three fan rotors include at least two distinct diameters of fan rotors.

In another embodiment according to any of the previous embodiments, each of the at least three fan rotors have a different diameter.

In another embodiment according to any of the previous embodiments, a gear ratio of the gears drive the fan rotor differs across at least two of the fan rotors.

In another embodiment according to any of the previous embodiments, a pressure ratio provided across the at least three fan rotors differs across at least two of the fan rotors.

In another embodiment according to any of the previous embodiments, a largest diameter of the at least three fan rotors is positioned to be closer to the fan drive turbine.

In another embodiment according to any of the previous embodiments, a gear ratio of the gears for driving the fan rotor differs across at least two fan rotors.

In another embodiment according to any of the previous embodiments, a highest gear reduction ratio is provided on the largest diameter fan rotor.

In another embodiment according to any of the previous embodiments, the shaft includes at least one flex coupling associated with a gear for driving one of the fan rotors.

In another embodiment according to any of the previous embodiments, each fan rotor is provided with a separately driven oil pump, oil supply and oil scavenge line.

In another embodiment according to any of the previous embodiments, a pressure ratio provided across the at least three fan rotors differs across at least two of the fan rotors.

In another embodiment according to any of the previous embodiments, the at least three fan rotors include at least two distinct diameters of fan rotors.

In another embodiment according to any of the previous embodiments, a lowest fan pressure ratio is provided by a largest diameter fan rotor.

In another embodiment according to any of the previous embodiments, the shaft is generally hollow.

In another embodiment according to any of the previous embodiments, adjacent ones of the at least three fan rotors are driven to rotate in opposed directions.

These and other features may be best understood from the following drawings and specification.

DETAILED DESCRIPTION

Figure 1:
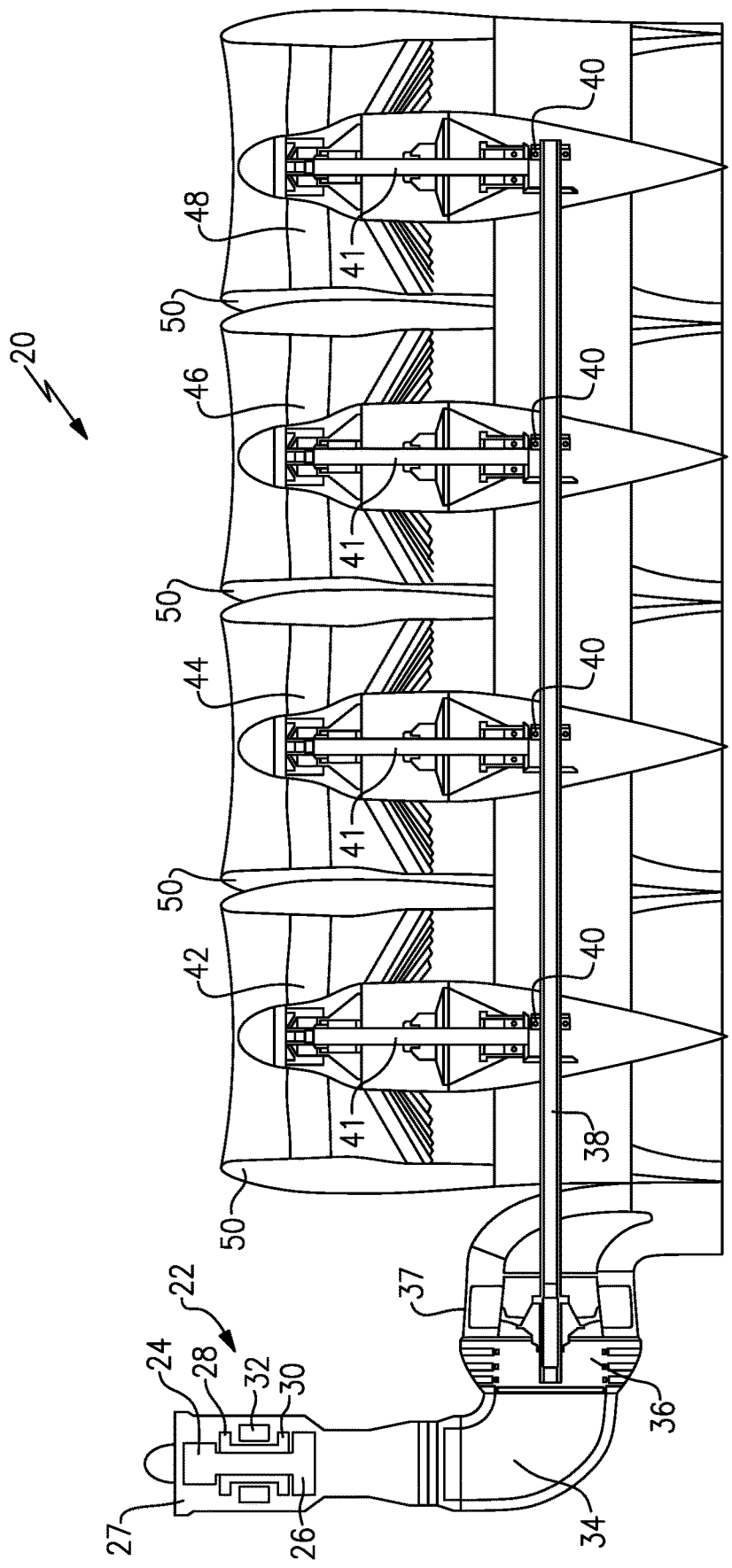
FIG. 1 schematically shows a gas turbine engine.

A gas turbine engine 20 is illustrated in FIG. 1 having a gas generator 22. The gas generator 22 may be a two spool gas generator having a low speed spool in which a first upstream compressor rotor 24 driven by a downstream or low pressure turbine rotor 26. A high speed spool includes a high pressure compressor rotor 28 rotating with a high pressure or upstream turbine rotor 30. A combustion section 32 is positioned intermediate rotors 28 and 30.

An exhaust duct 34 is positioned downstream of the gas generator 22 and receives products of combustion which have driven the turbine rotor 26 to rotate. These products of combustion pass across a fan drive turbine 36 mounted in a housing 37. The fan drive turbine 36 drives a shaft 38 that engages a plurality of bevel gears 40 to, in turn, drive shafts 41 associated with fan rotors 42, 44, 46 and 48. Each of the fan rotors 42, 44, 46 and 48 are mounted within separate housings 50.

By providing a single shaft 38, which drives at least four fan rotors and by utilizing a fan drive turbine 36 which is positioned downstream of the last turbine rotor 26 in a gas generator 22, this disclosure provides compact packaging, while still providing adequate drive for the fan rotors 42, 44, 46 and 48.

Figure 2:
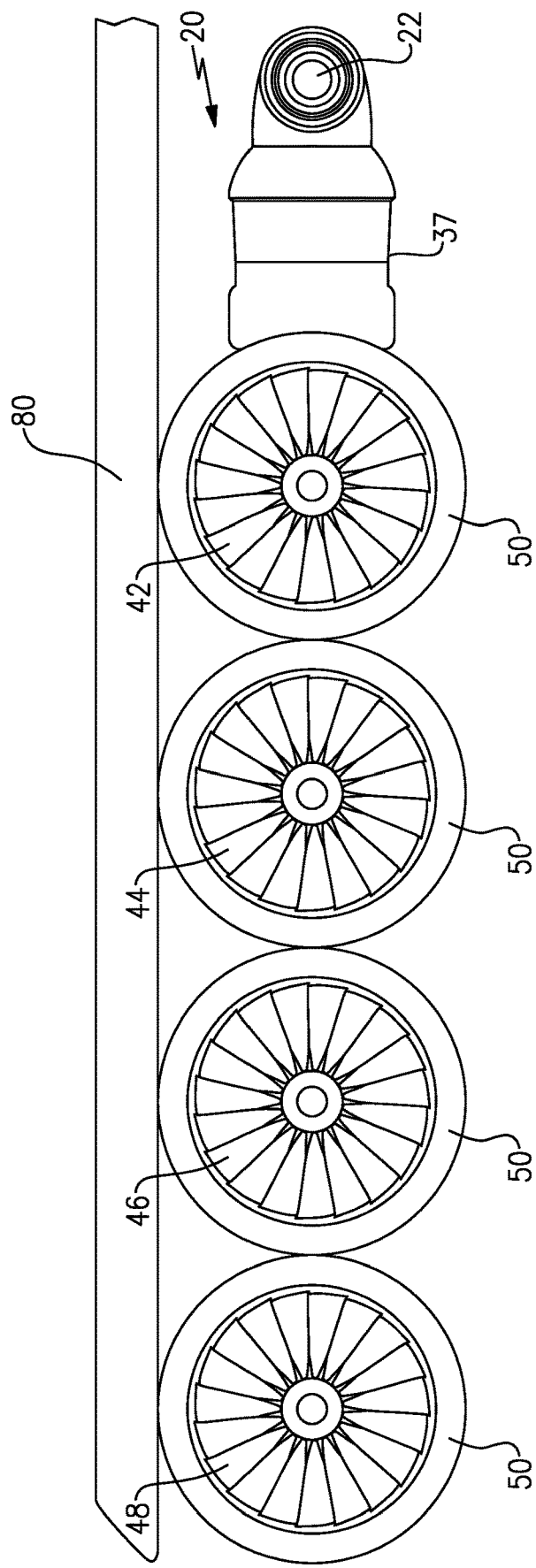
FIG. 2 is a front view of the FIG. 1 engine.

FIG. 2 is a front view of an aircraft wing 80, which may mount an engine such as engine 20. As shown, the gas generator is associated with the housing 37. The fan rotors 42, 44, 46 and 48 have diameters that are not unduly large, such that they fit within the packaging window of associated wing 80.

Figure 3:
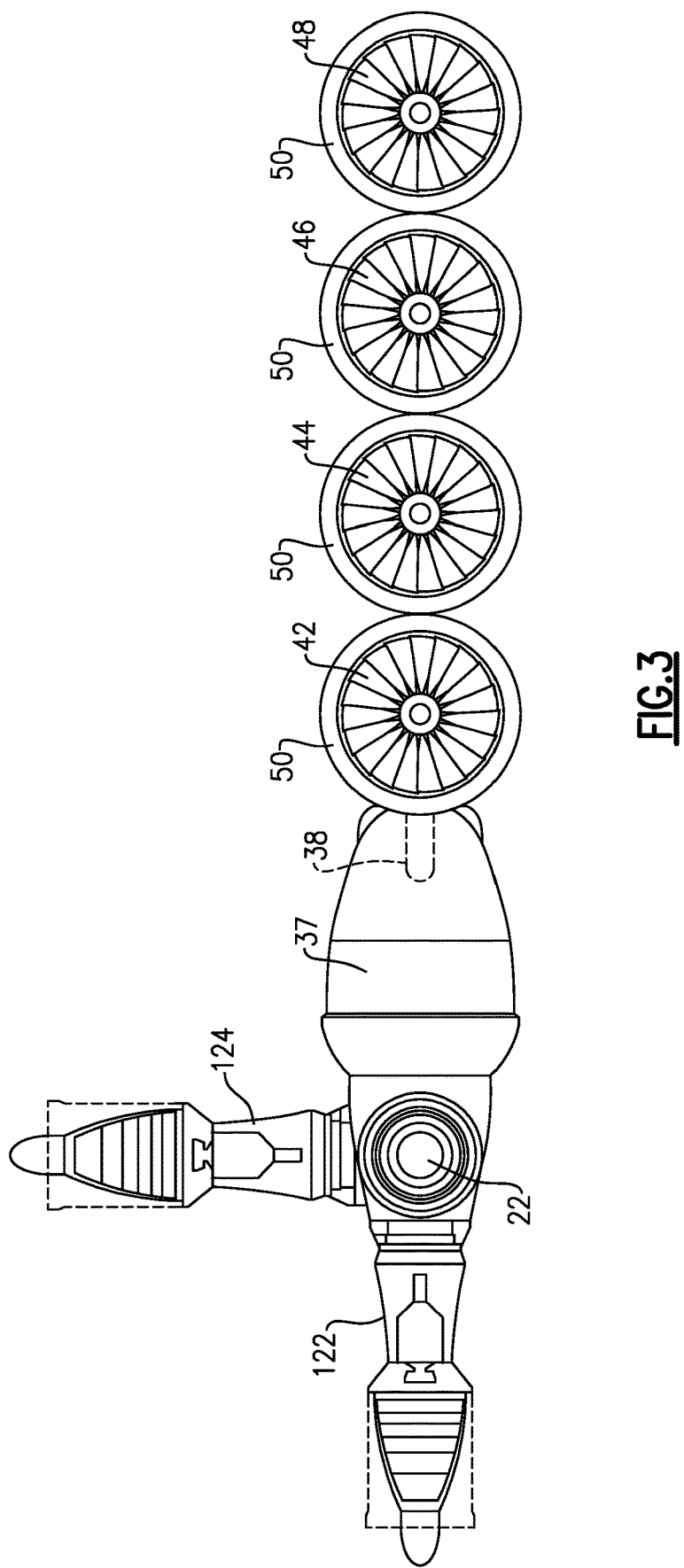
FIG. 3 shows alternative arrangements.

FIG. 3 shows alternative gas generators 122 and 124. As shown, gas generator 122 extends to be generally parallel (actually coaxially) to the shaft 38. Gas generator 124 extends generally vertically upwardly. Gas generators 22 and 124 rotate about an axis that is generally perpendicular to shaft 38. Any number of other arrangements of gas generators relative to the shaft may be included. As can be appreciated, the fan drive turbine 36 of FIG. 1, and the fan drive turbine of the engine 12 as shown in FIG. 3 rotate on an axis this is non-parallel to the drive axis of turbine 26. As illustrated, the fan drive turbines rotate about an axis that is perpendicular to the drive axes of either engine 22 or 124.

Figure 4:
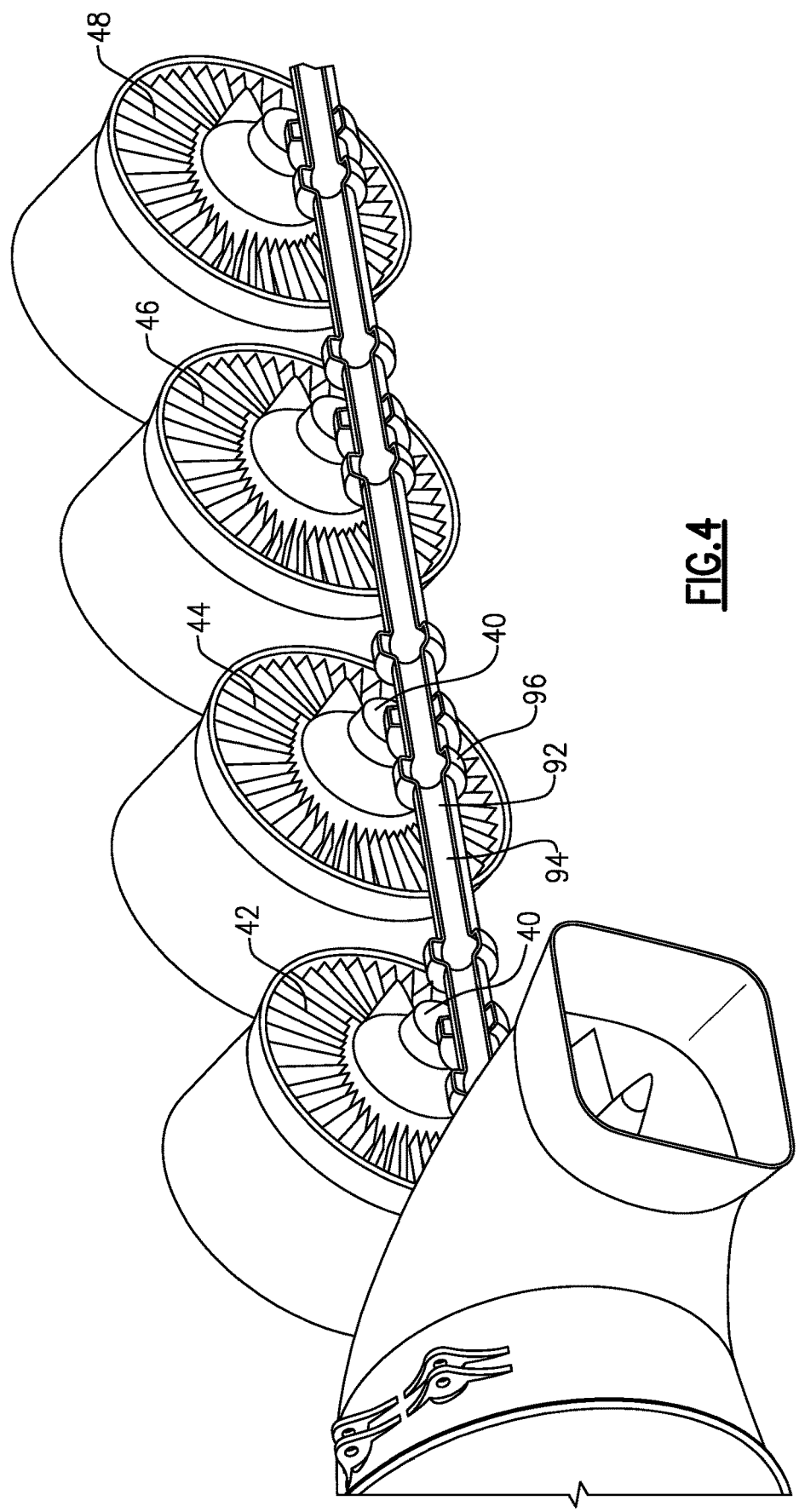
FIG. 4 shows another feature.

FIG. 4 shows an alternative shaft 92 driving fan rotors 42, 44, 46 and 48. This shaft 92 is hollow as shown at 94 and has flex couplings 96 both upstream and downstream in a drive direction from the bevel gears 40. The flexible shaft allows wing 80 to deflect, without interrupting the drive to any one of the fan rotors.

Figure 5:
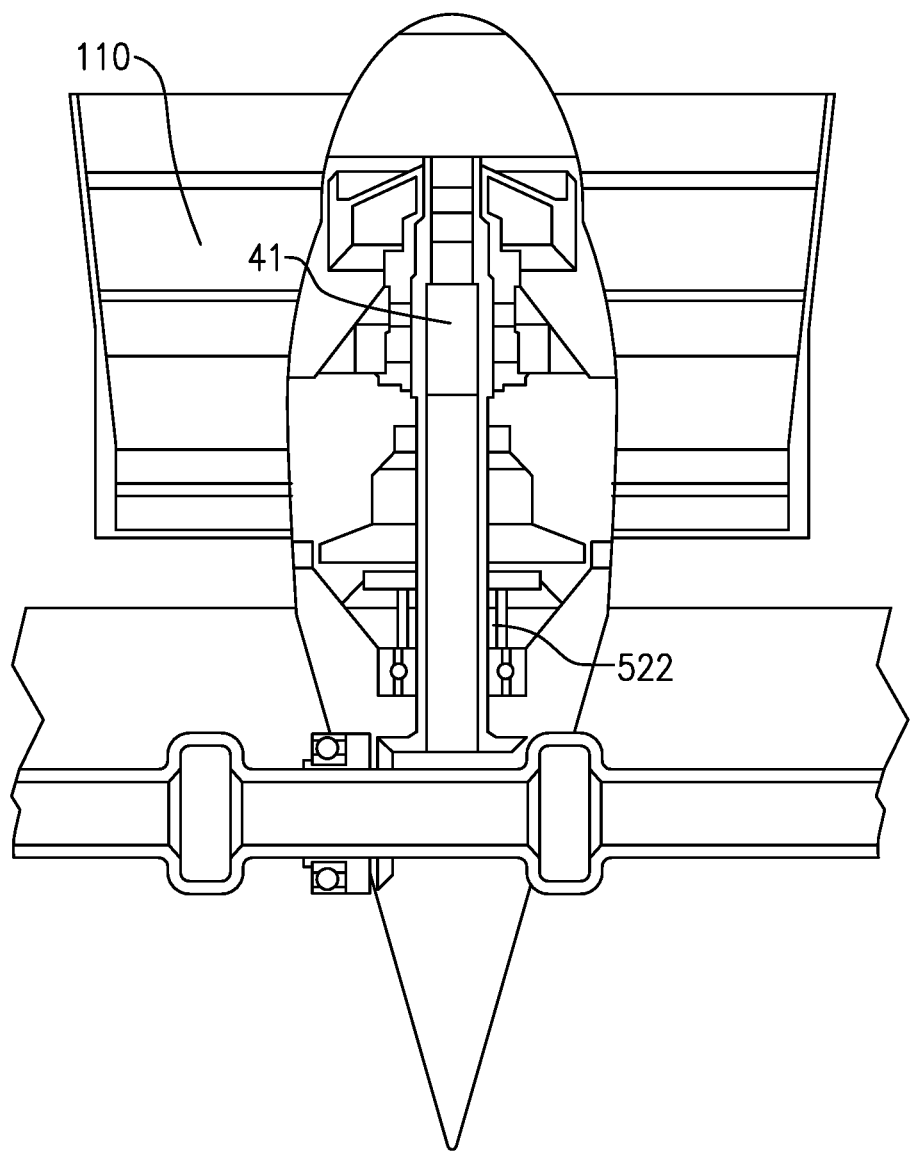
FIG. 5 shows yet another feature.

FIG. 5 shows a further detail in which a fan rotor 110 is provided with an oil supply scavenge return line and an oil pump, shown schematically at 522. Given the spaced distance of the fan rotors from the gas generator, it would be desirable to have the oil supply incorporated into the fan itself rather than requiring oil lines to extend outwardly to the fan.

Figure 6:
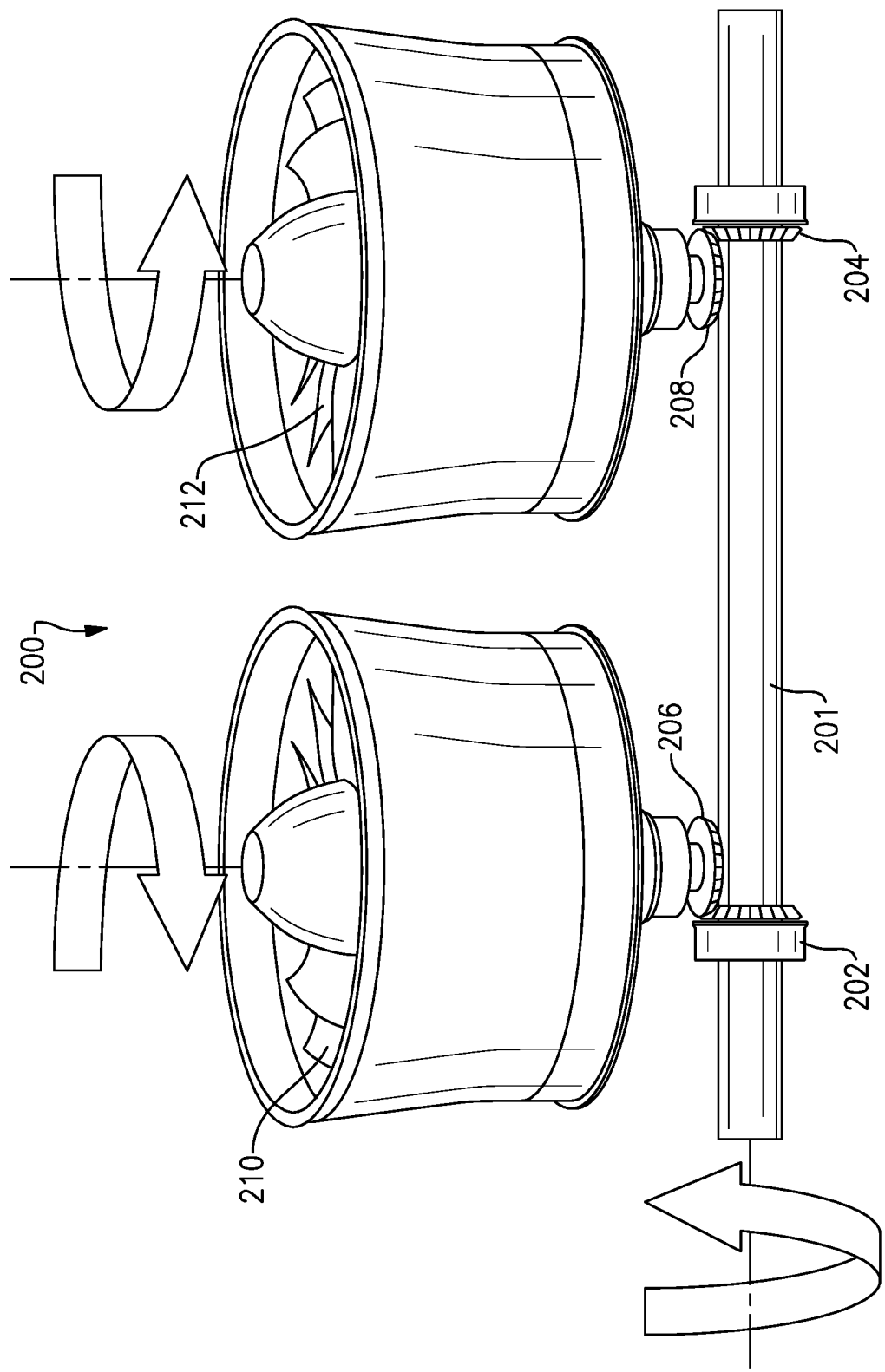
FIG. 6 shows an option.

FIG. 6 shows a shaft embodiment 200 wherein the gears 202 and 204 associated with the shaft 201 engage bevel gears 206 and 208 to, in turn, drive fan rotors 210 and 212 in opposed directions. As shown, one is driven counterclockwise while an adjacent one is driven clockwise. This may be beneficial if it is desired to cancel engine gyro effects.

Figure 7:
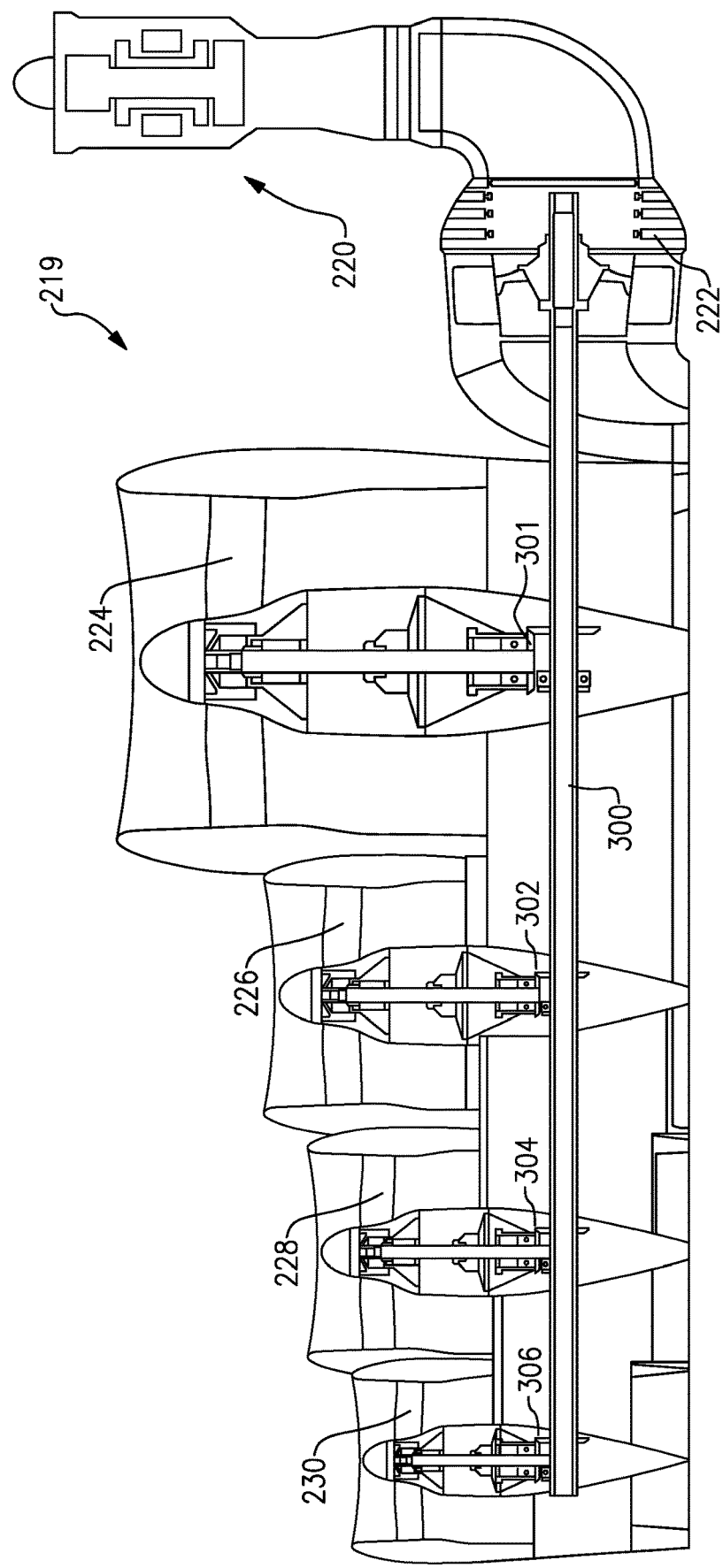
FIG. 7 shows another embodiment.

FIG. 7 shows an engine 219 wherein the gas generator 220 delivers air across a fan drive turbine 222 driving a shaft 300. As shown, the shaft 300 drives gear 301 associated with the fan rotor 224, gear 302 associated with fan rotor 226, gear 304 associated with fan rotor 228, and gear 306 associated with fan rotor 230. As can be appreciated, the diameter of the fan rotors decreases from fan rotor 224 through rotors 226, 228 and 230. In addition, the fan pressure ratio may increase along this direction such that the fan pressure ratio of the fan rotor 224 may be lower (1.3, for example) while the fan pressure ratio at the rotor 230 may be higher (1.8, for example). In addition, a gear ratio which reduces the speed of the fan rotors 224, 226, 228 and 230 relative to shaft 300 may decrease from the fan rotor 224 toward the fan rotor 230. As an example, the gear ratio of the gear 301 may be 1.62 while the gear ratio of the gear 306 may be 0.93. In this way, the fan rotor 230 will rotate faster than the fan rotor 224.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a gas generator with at least one compressor rotor, at least one gas generator turbine rotor and a combustion section, and there being a fan drive turbine positioned downstream of a path of products of combustion having passed over said at least one gas generator turbine rotor, said fan drive turbine driving a shaft and said shaft engaging gears to drive at least three fan rotors;
there being an exhaust duct downstream of said gas generator turbine rotor, and said fan drive turbine being downstream of said exhaust duct; and
wherein a drive axis of said fan drive turbine is non-parallel to a drive axis of said at least one gas generator turbine rotor.

2. The gas turbine engine as set forth in claim 1, wherein said at least one compressor rotor includes at least two compressor rotors and said at least one gas generator turbine rotor includes at least two gas generator turbine rotors, with said fan drive turbine being positioned to be downstream of a path of the products of combustion having passed over each of said at least two gas generator turbine rotors.

3. The gas turbine engine as set forth in claim 1, wherein the drive axis of rotation of said gas generator turbine rotor is generally perpendicular to the drive axis of rotation of said fan drive turbine.

4. The gas turbine engine as set forth in claim 1, wherein said at least three fan rotors, including at least two distinct diameters of fan rotors.

5. The gas turbine engine as set forth in claim 4, wherein each of said at least three fan rotors have a different diameter.

6. The gas turbine engine as set forth in claim 5, wherein a gear ratio of said gears for driving said fan rotor differs across at least two of said fan rotors.

7. The gas turbine engine as set forth in claim 6, wherein a pressure ratio provided across said at least three fan rotors differs across at least two of said fan rotors.

8. The gas turbine engine as set forth in claim 5, wherein a largest diameter fan rotor of said at least three fan rotors is positioned to be closer to said fan drive turbine.

9. The gas turbine engine as set forth in claim 8, wherein a highest gear reduction ratio is provided on said largest diameter fan rotor.

10. The gas turbine engine as set forth in claim 1, wherein a gear ratio of said gears for driving said fan rotor differs across at least two fan rotors.

11. The gas turbine engine as set forth in claim 1, wherein said shaft includes at least one flex coupling associated with one of the gears for driving one of said fan rotors.

12. The gas turbine engine as set forth in claim 1, wherein a pressure ratio provided across said at least three fan rotors differs across at least two of said fan rotors.

13. The gas turbine engine as set forth in claim 12, wherein said at least three fan rotors, including at least two distinct diameters of fan rotors.

14. The gas turbine engine as set forth in claim 13, wherein a lowest fan pressure ratio is provided by a largest diameter fan rotor of said at least three fan rotors.

15. The gas turbine engine as set forth in claim 14 wherein said shaft is generally hollow.

16. The gas turbine engine as set forth in claim 1, wherein adjacent ones of said at least three fan rotors are driven to rotate in opposed directions.

17. The gas turbine engine as set forth in claim 1, wherein said drive axis of fan drive turbine is perpendicular to a said drive axis of said at least one gas generator turbine rotor.

18. A gas turbine engine comprising:
- a gas generator with at least one compressor rotor, at least one gas generator turbine rotor and a combustion section, and there being a fan drive turbine positioned downstream of a path of products of combustion having passed over said at least one gas generator turbine rotor, said fan drive turbine driving a shaft and said shaft engaging gears to drive at least three fan rotors;
- there being an exhaust duct downstream of said gas generator turbine rotor, and said fan drive turbine being downstream of said exhaust duct;
- wherein a drive axis of said fan drive turbine is non-parallel to a drive axis of said at least one gas generator turbine rotor;
- wherein said shaft is generally hollow; and
- wherein said shaft includes at least one flex coupling associated with one of the gears for driving one of said fan rotors.

19. The gas turbine engine as set forth in claim 18, wherein each of said at least three fan rotors is provided with a separate oil pump, oil supply and oil scavenge line.

20. A gas turbine engine comprising:
- a gas generator with at least one compressor rotor, at least one gas generator turbine rotor and a combustion section, and there being a fan drive turbine positioned downstream of a path of products of combustion having passed over said at least one gas generator turbine rotor, said fan drive turbine driving a shaft and said shaft engaging gears to drive at least three fan rotors;
- there being an exhaust duct downstream of said gas generator turbine rotor, and said fan drive turbine being downstream of said exhaust duct;
- wherein a drive axis of said fan drive turbine is non-parallel to a drive axis of said at least one gas generator turbine rotor; and
- wherein each of said at least three fan rotors is provided with a separate oil pump, oil supply and oil scavenge line.

* * * * *